United States Patent [19]

Seidel

[11] 3,895,321

[45] July 15, 1975

[54] MINIMUM PHASE DIFFERENTIAL PHASE SHIFTER

[75] Inventor: Harold Seidel, Warren, N.J.

[73] Assignee: Bell Telephone Laboratories, Incorporated, Murray Hill, N.J.

[22] Filed: Aug. 9, 1974

[21] Appl. No.: 496,151

[52] U.S. Cl. .......... 333/11; 333/29

[51] Int. Cl.[2] .......... H03H 7/18

[58] Field of Search .......... 333/29, 31 R, 1, 6, 9, 333/11

[56] References Cited

UNITED STATES PATENTS 2,661,458 12/1953 Saraga .......... 333/6

3,346,823 10/1967 Maurer et al. .......... 333/11

*Primary Examiner*—James W. Lawrence

*Assistant Examiner*—Marvin Nussbaum

*Attorney, Agent, or Firm*—S. Sherman

[57] ABSTRACT

A procedure for synthesizing any prescribed differential phase shift by means of passive lumped element, minimum phase networks is outlined.

In a first embodiment of the invention, the phase shifters are made of quadrature couplers. In a second embodiment of the invention, bridged-T phase shifters are employed.

4 Claims, 11 Drawing Figures

FIG. 1
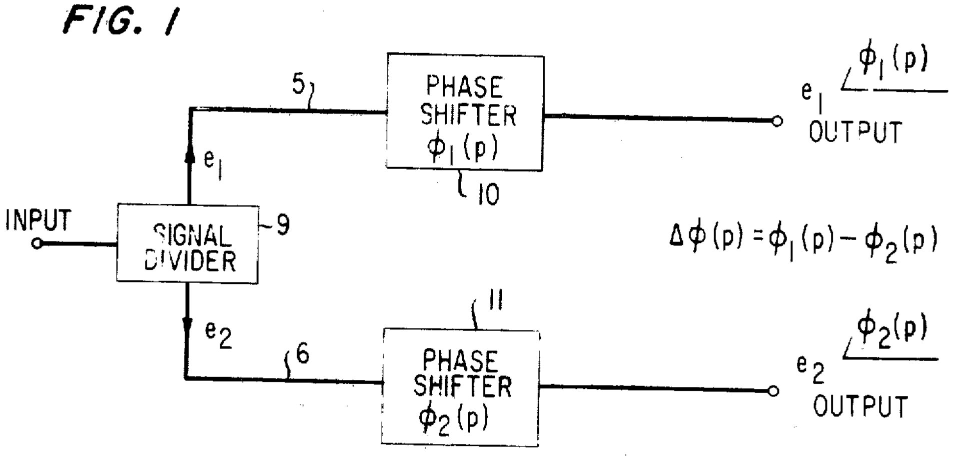
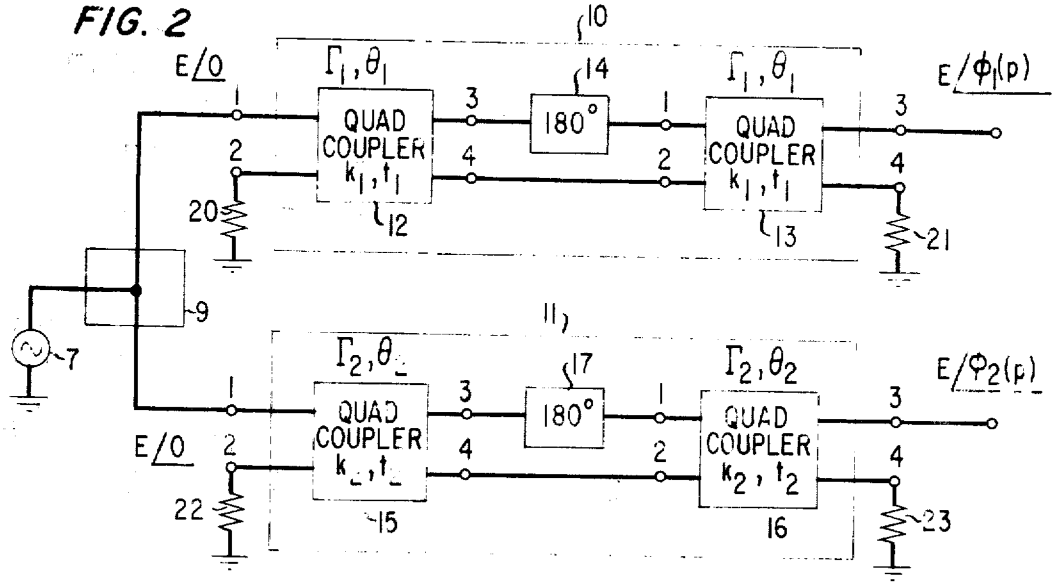
FIG. 3
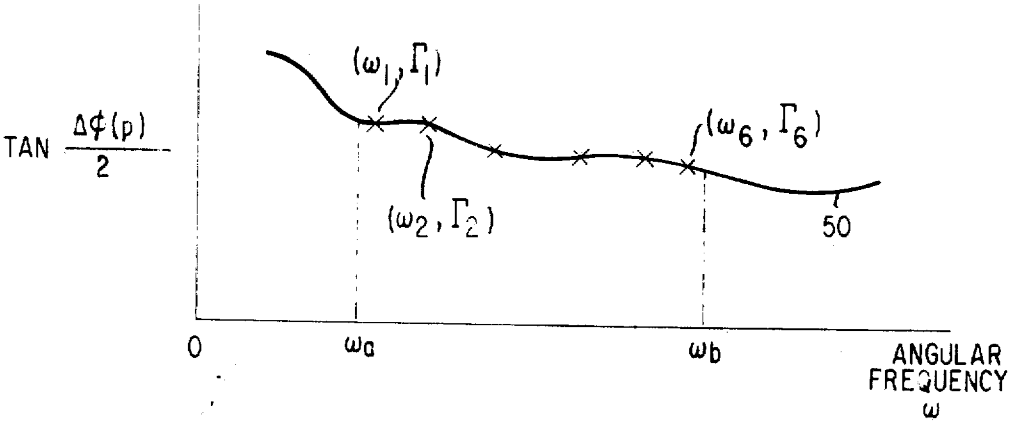

MINIMUM PHASE DIFFERENTIAL PHASE SHIFTER

This application relates to differential phase shifters.

BACKGROUND OF THE INVENTION

There are many applications wherein it is important to adjust accurately the relative phase shift of two signals propagating along two different signal paths. See, for example, the feedforward amplifier described in U.S. Pat. No. 3,667,065, and the distortion compensation networks disclosed in U.S. Pat. No. 3,732,502.

In many cases, the desired phase characteristic over the frequency band of interest is relatively simple and can be readily realized by means of a single phase shifter located in one of the two signal paths. There are, however, more complicated phase characteristics that include portions having a negative slope, corresponding to negative time delays. Since it is physically impossible to create a negative time delay, the practice in the past has been to include different lengths of transmission line in the two wavepaths such that the positive delays produced thereby more than offset the required negative time delay.

While the use of transmission lines to introduce relative time delay is sound in theory, it is often impractical because of space limitations.

If, on the other hand, one seeks to produce a prescribed differential phase shift using only passive lumped element circuit components, one is faced with an infinity of solutions where only one is physically realizable as a minimum phase network. The problem then is to find the one realizable minimum phase solution.

The term "minimum phase," as used herein, refers to that network or solution which serves to produce the desired result without any gratuitous elements. It will be recognized that identical phase shifters, added to both wavepaths, produce no net differential phase shift between signals in the two paths. However, their inclusion serves only to complicate the circuits and, accordingly, are advantageously omitted. The minimum phase shifters obtained in accordance with the teachings of the present invention omit all such unessential phase shift elements.

It is, accordingly, the broad object of the present invention to synthesize any prescribed differential phase shift using passive lumped element circuits by means of minimum phase networks.

SUMMARY OF THE INVENTION

A prescribed differential phase shift between two phase coherent signals propagating along two different wavepaths is obtained, in accordance with the present invention, by means of a pair of minimum phase phase shifters that include only passive lumped element circuit components.

Expressing the prescribed differential phase shift as $$\Phi(p) = 2 \arctan \operatorname{Im} \Gamma(p), \tag{1}$$

where $$p = i\omega,$$

$\omega$ is the angular frequency;

and $\Gamma(p)$ is expressible as the ratio of an odd order polynomial and an even order polynomial; it is shown that there is one and only one physically realizable way of distributing the phase shift between two minimum phase phase shifters. A procedure for determining this one solution is outlined.

In a first embodiment of the invention, each phase shifter comprises a tandem array of two identical quadrature couplers connected by means of a 180° phase shifter. One network, located in one signal path, has a phase characteristic $\Phi_1(p)$. The other network, located in the second signal path, has a phase characteristic $\Phi_2(p)$. The resulting net differential phase shift is then given by $\Phi_1(p) - \Phi_2(p)$.

In a second embodiment of the invention, bridged-T phase shifters of the type disclosed in applicant's copending application, Ser. No. 481,891, filed June 21, 1974 are used.

These and other objects and advantages, the nature of the present invention, and its various features, will appear more fully upon consideration of the various illustrative embodiments now to be described in detail in connection with accompanying drawings.

BRIEF DESCRIPTION OF THE DRAWINGS

FIG. 1 shows, in block diagram, a circuit for producing a differential phase shift between signals in two signal wavepaths;

FIG. 2 shows, in block diagram, the circuit according to FIG. 1 wherein the phase shift in each of the two wavepaths is produced by means of an all-phase network made up of lumped element quadrature couplers;

FIG. 3 shows an illustrative phase characteristic as a function of frequency;

DETAILED DESCRIPTION

Figure 4:
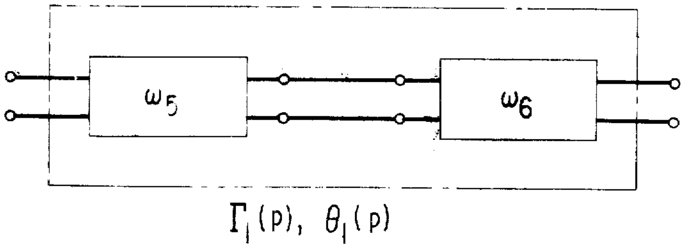
FIGS. 4 and 5 show arrays of lumped element quadrature couplers.

Referring to the drawings, FIG. 1 shows in block diagram a circuit for producing any arbitrary differential phase shift $\Delta\Phi(p)$ between two signals $e_1$ and $e_2$ propagating along two signal wavepaths 5 and 6. The two wavepaths are coupled to a common input port by means of a signal divider 9.

A first phase shifter 10, located in signal path 5, produces a phase shift $\Phi_1(p)$ in signal $e_1$. A second phase shifter 11, located in signal path 6, produces a phase shift $\Phi_2(p)$ in signal $e_2$. The net differential phase shift between the two signals introduced by phase shifters 10 and 11 is, therefore, $$\Delta\Phi(p) = \Phi_1(p) - \Phi_2(p) \tag{2}$$

It would appear from equation (2) that, knowing the desired differential phase shift $\Delta\Phi(p)$, one could arbitrarily select either $\phi_1(p)$ or $\Phi_2(p)$ and solve for the other. One can, of course, do this in the mathematic sense and obtain a solution. However, one would soon discover that the solutions typically call for negative inductors and capacitors and, as such, are physically unrealizable. In fact, it can be shown that of the infinity of possible minimal phase mathematic solutions, there is only one that is physically realizable. The procedure for finding this one solution is outlined hereinbelow.

1. Given $\Delta\Phi(p)$, we represent the latter as $$\Delta\Phi(p) = 2 \arctan \operatorname{Im} \Gamma(p), \quad (3)$$

where $\Gamma(p)$ is expressed as the ratio of an odd order polynomial, $O(p)$, and an even polynomial, $E(p)$. That is $\Gamma(p)$ can be expressed as either $$\Gamma(p) = \frac{O(p)}{E(p)}, \quad (4)$$

or $$\Gamma(p) = \frac{E(p)}{O(p)}. \quad (5)$$

2. In either case, form the equation $$1 + \Gamma(p) = 0 \quad (6)$$

and solve for the roots of $p$, obtaining roots $p_1, p_2 \cdots p_n$.

3. The roots are then separated into two groups (a) and (b), where group (a) roots include all roots whose real parts are positive, and group (b) roots include all roots whose real parts are negative.

4. Form a polynomial $p_1(p)$ of the negative of all the roots in group (*a*).

5. Segregate the even order terms $E_1(p)$ and the odd order terms $O_1(p)$ of polynomial $p_1(p)$ and form the ratio $$\Gamma_1(p) = \frac{E_1(p)}{O_1(p)} \quad (7)$$

$$\Gamma_1(p) = \frac{O_1(p)}{E_1(p)}, \quad (8)$$

being consistent with the ratio used for $\Gamma(p)$.

6. Form a polynomial $p_2(p)$ of all the roots in group (*b*).

7. Segregate the even order terms $E_2(p)$ and the odd order terms $O_2(p)$ of polynomial $p_2(p)$ and form the ratio $$\Gamma_2(p) = \frac{E_2(p)}{O_2(p)} \quad (9)$$

or $$\Gamma_2(p) = \frac{O_2(p)}{E_2(p)}. \quad (10)$$

again, being consistent with the ratios used to form $\Gamma(p)$.

8. The phase shift characteristics $\Phi_1(p)$ and $\Phi_2(p)$ for the two phase shifter 10 and 11 that yield physically realizable minimal phase circuits, and produce the prescribed differential phase shift $\Phi\Delta(p)$, are then $$\Phi_1(p) = 2 \arctan \operatorname{Im} \Gamma_1(p) \quad (11)$$

and $$\Phi_2(p) = 2 \arctan \operatorname{Im} \Gamma_2(p). \quad (12)$$

NUMERICAL EXAMPLE (1) Given $$\Delta\Phi(p) = 2 \arctan \operatorname{Im}\Gamma(p), \quad (13)$$

where $$\Gamma(p) = \frac{p^3+p}{4p^2-6}. \quad (14)$$

2 Form equation $$1 + \Gamma(p) = 0, \quad (15)$$

giving $$1 + \frac{p^3+p}{4p^2-6} = 0. \quad (16)$$

Solving for the roots, we obtain $p_1 = 1$
$p_2 = -2$
$p_3 = -3$.

3 Group (a) root is $p_1 = 1$.

Group (b) roots are $p_2 = -2$
$p_3 = -3$.

4 The group (a) root polynomial is $$P_1(p) = p + 1 \quad (17)$$

5 Therefore $\operatorname{Im} \Gamma_1(p) = \omega$. (18)

6 The group (b) root polynomial is $$P_2(p) = (p + 2)(p + 3) = p^2 + 5p + 6 \quad (19)$$

(7) Therefore $Im\ \Gamma_2(p) = \dfrac{5\omega}{-\omega^2 + 6}$ (20)

8 The two derived phase shift characteristics $\Phi_1(p)$ and $\Phi_2(p)$ are then $$\Phi_1(p) = 2 \arctan \omega \quad (21)$$

and $$\Phi_2(p) = 2 \arctan \frac{5\omega}{-\omega^2 + 6}. \quad (22)$$

As indicated hereinabove, the distribution of phase shift between the two wavepaths as given by equations (21) and (22) is unique in that it is the only distribution that is physically realizable.

Thus far, the $\Gamma(p)$ function has been considered simply as a mathematical expression. In the two illustrative embodiments now to be considered, the physical significance of the $\Gamma(p)$ function will become apparent along with the physical significances of the various procedural steps described hereinabove.

Referring once again to the drawings, FIG. 2 shows, in block diagram, a first illustrative embodiment of the invention for producing an arbitrary differential phase shift $\Delta\Phi(p)$. Using the same identification numerals as in FIG. 1 to identify corresponding components, the circuit includes two wavepaths 5 and 6 connected to a common signal source 7. Located in signal path 5 is a first phase shifter 10 comprising a tandem array of two identical quadrature couplers 12 and 13 connected by means of a 180° phase shifter 14. A second phase shifter 11, located in path 6, also comprises a tandem array of two identical quadrature couplers 15 and 16 connected by means of a 180 degree phase shifter 17, where couplers 15 and 16 are different than couplers 12 and 13.

Each of the couplers 12, 13, 15 and 16 has four ports 1, 2, 3 and 4, arranged in pairs 1–2 and 3–4, where the ports of each pair are conjugate to each other and in coupling relationship with the ports of the other of said pairs. More particularly, a coupling coefficient t defines the coupling between ports 1–3 and 2–4, and a coupling coefficient $k$ defines the coupling between ports 1–4 and 2–4. While $t$ and $k$ are generally complex quantities whose magnitudes and phases vary as a function of frequency, they are related at all frequencies such that $$|k^2| + |t^2| = 1 \tag{23}$$

In addition, the coupling coefficients bear a constant 90° phase shift relative to each other.

In a tandem array of couplers, the ports of one pair of conjugates of one coupler are connected, respectively, to the ports of one pair of conjugate ports of the next coupler in the array. Thus, in each of the phase shifters 10 and 11, ports 3 and 4 of the first coupler 12, 15 are connected, respectively, to ports 1 and 2 of the second coupler 13, 16 to form, in each case, a tandem array. More specifically, as disclosed in U.S. Pat. No. 3,184,691, when these two connections include a 180° relative phase shift, the array becomes an allpass network wherein an input signal, applied to the input port of the first coupler, is coupled solely to one of the two possible outupt ports of the second coupler. Thus, phase shifter 10 includes a 180° phase shifter 14 in the path connecting port 3 of coupler 12 to port 1 of coupler 13, and phase shifter 11 includes a 180° phase shifter 17 in the path connecting port 3 of coupler 15 to port 1 of coupler 16.

As noted, when connected in the manner described, an input signal $E\ \underline{|O}$, applied to port 1 of coupler 12, produces an output signal E, at port 3 of coupler 13 at an angle of lag $\Phi_1(p)$ given by $$\Phi_1(p) = 2 \arctan \operatorname{Im} \Gamma_1(p), \tag{24}$$

where $\Gamma_1(p)$, is the signal division ratio for each of the couplers 12 and 13, and is given by $$\Gamma_1(p) = k_1/t_1. \tag{25}$$

Similarly, signal $E\ \underline{|O}$, applied to port 1 of coupler 15 produces an output signal E at port 3 of coupler 16 at an angle of lag $\Phi_2(p)$ given by $$\Phi_2(p) = 2 \arctan \operatorname{Im} \Gamma_2(p), \tag{26}$$

where $\Gamma_2(p)$ is the signal division ratio for each of the couplers 15 and 14, and is given by $$\Gamma_2(p) = k_2/t_2. \tag{27}$$

The net differential phase shift between the two output signals is then $$\Delta\Phi(p) = \Phi_1(p) - \Phi_2(p) = 2 \arctan \operatorname{Im} \Gamma(p) - 2 \arctan \operatorname{Im} \Gamma(p). \tag{28}$$

As can be seen from equations (25) and (27), the Γ function in this embodiment characterizes the signal division ratio of the quadrature couplers that make up the all-pass networks 10 and 11. From equation (28) it would appear that in order to obtain a particular differential phase shift, one would simply define one of the two variables $\Gamma_1(p)$ or $\Gamma_2(p)$, and then solve for the other. However, if this random approach is used, the likelihood of obtaining a physically realizable solution is remote, for reasons that will now be explained.

In U.S. Pat. Nos. 3,514,722 and 3,763,437, it is shown that one can synthesize an equivalent quadrature coupler having any arbitrary signal division ratio, expressible as the ratio of an odd order polynomial and an even order polynomial, by means of a tandem array of lumped element quadrature couplers. Thus, each of the couplers 12 and 13 in phase shifter 10, and each of the couplers 15 and 16 in phase shifter 11 can be defined as a tandem array of lumped element quadrature couplers having the prescribed signal division ratio called for by equation (28). However, in the general case this synthesis calls for both positive and negative coupler sections, where the term "negative" coupler relates to a coupler made up of a negative inductors and negative capacitors. Since such circuit elements are unrealizable using simple passive elements, a negative coupler, for all practical purposes, is also unrealizable. In those cases where one is concerned only with the signal division ratio, the equivalent of a negative coupler can be realized by means of a positive coupler preceded by a 180° phase shifter, as described in U.S. Pat. No. 3,514,722. However, where phase shift is concerned, as in the present case, this expedient cannot be used. Thus, a difficulty with the above-noted random technique for designing a differential phase shifter resides in the fact that the particular choice of $\Gamma_1(p)$, or the particular solution for $\Gamma_2(p)$ may call for a coupler array that includes one or more negative coupler sections. To avoid this result, one proceeds in the manner outlined hereinabove in connection with FIG. 1. However, knowing the physical significance of the various steps in the procedure, a number of modifications and simplications can be made, as illustrated by the following example.

EXAMPLE

1. Express the desired phase shift function as $$\Delta\Phi(p) = 2 \arctan \text{Im}\, \Gamma(p) \; ; \tag{29}$$

2. Solve for $\Gamma(p)$, obtaining $$\text{Im}\, \Gamma(p) = \tan \Delta\Phi(p)/2 \; ; \tag{30}$$

3. Plot $\tan \Delta\Phi(p)/2$ as a function of frequency, $\omega$, obtaining a curve 50, as illustrated in FIG. 3;
4. Define a frequency range of interest, $\omega_a$ to $\omega_b$, as indicated in FIG. 3;
5. Express $\Gamma(p)$ as a ratio of an odd order polynominal to an even order polynominal $$\Gamma(p) = \frac{a_1p^1 + a_3p^3 + a_5p^5 + \ldots a_{2n-1}p^{2n-1}}{1 + a_2p^2 + a_4p^4 + \ldots a_{2m}p^{2m}} \tag{31}$$

where $n$ and $m$ are integers.

6. To define the coefficients $a_1, a_2, \ldots a_{2n-1}$ and $a_2, a_4 \ldots a_{2n}$ we must first decide how many coupler sections we propose to employ, remembering that, in fact, twice as many will be used to form the two all-pass networks. If the $\Gamma(p)$ function is a relatively simple one, fewer couplers are, in general, required to approximate the function. On the other hand, if $\Gamma(p)$ is a more complex function, a better match is obtained by using a larger number of sections. The determining factor in any solution is the maximum allowable deviation that can be tolerated by the system. For purposes of illustration, we elect to employ six section to synthesize the $\Gamma$ function. This also defines the highest order term in the $\Gamma$ function as $p^6$ so that equation (31) reduces to $$\Gamma(p) = \frac{a_1p_1 + a_3p^3 + a_5p^5}{1 + a_2p^2 + a_4p^4 + a_6p^6}. \tag{32}$$

7. Substituting for each of the selected points $(\omega_1, \Gamma_1)$, $(\omega_2, \Gamma_2) \ldots (\omega_6, \Gamma_6)$, we obtain six equations which are solved simultaneously for the six coefficients $a_1, a_2, a_3 \ldots a_6$. In this manner, the $\Gamma(p)$ function is approximated within specified limits.
8. We then form the equation $$1 + \Gamma(p) = 0 \tag{33}$$

and solve for the six roots of the equation. These, in general, can include negative real roots, positive real roots, and complex roots which can have either positive or negative real components. For purposes of illustration, we assumed a solution which includes four positive real roots $p_1, p_2, p_3, p_4$, and two negative real roots $-p_5$, and $-p_6$, where the four positive roots correspond to negative couplers and the two negative roots correspond to positive couplers. These roots specify the crossover frequencies for the six coupler sections, where the crossover frequency is that frequency for which $|k| = |t|$ for the respective coupler.

What we have synthesized thus far is a tandem array of six couplers having an overall signal division ratio $\Gamma(p)$, and a phase shift $\Delta\Phi(p)/2$ over the band $\omega_a$ to $\omega_b$ such that $$\frac{\Delta\phi(p)}{2} = \arctan Im\, \Gamma(p) . \tag{34}$$

Such an array, however, is unrealizable in that it includes four negative couplers. This illustrates that the prescribed phase shift cannot be synthesized by means of one phase shifter. Accordingly, we proceed, in accordance with the teachings of the present invention, to consider the two positive and four negative couplers separately. In particular, we consider first a tandem array of the two positive couplers whose crossover frequencies are $\omega_5$ and $\omega_6$. These two couplers, illustrated in FIG. 4, form an equivalent coupler having a signal division ratio $\Gamma_1(p)$ and phase shift $\theta_1(p)$ such that $$\theta_1(p) = \arctan \text{Im}\, \Gamma_1(p). \tag{35}$$

Figure 5:
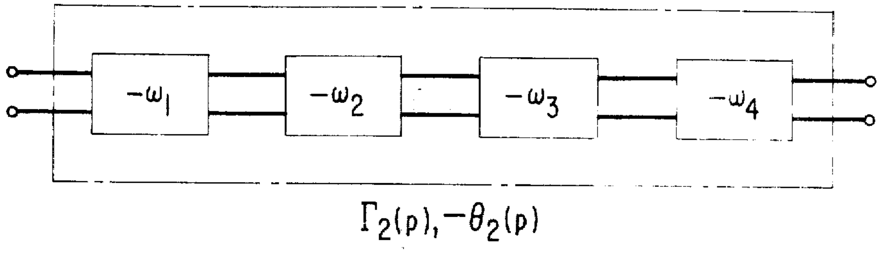

Similarly, a tandem array of the four negative couplers, illustrated in FIG. 5, form a second equivalent coupler having a signal division ratio $\Gamma_2(p)$ and a phase shift $\theta_2(p)$ such that $$\theta_2(p) = \arctan \text{Im}\, \Gamma_2(p). \tag{36}$$

The net phase shift through a tandem array of the positive couplers of FIG. 4 and the negative couplers of FIG. 5 is then $$\frac{\Delta\phi(p)}{2} = \theta_1(p) - \theta_2(p) . \tag{37}$$

While it is recognized that the negative couplers are unrealizable, the equivalent of the negative phase shift $\theta_2(p)$ can be obtained by placing the positive couplers in one of the two signal paths, and placing the positive equivalent of the negative couplers in the other signal path. (This, it will be noted, is the equivalent of taking the negative of the positive roots to form the polynomial $P_1$($p$in step (4) of the procedure outlined hereinabove in connection with FIG. 1.) Thus, if in the embodiment of FIG. 2, each of the couplers 12 and 13 includes the two positive couplers of FIG. 4, and each of the couplers 15 and 16 includes the positive equivalent of the four negative couplers of FIG. 5, the resulting phase shifts $\Phi_1(p)$ and $\Phi_2(p)$ through all-pass networks 10 and 11 are, respectively, $$\Phi_1(p) = 2\theta_1(p) = 2 \arctan \text{Im}\, \Gamma_1(p) \tag{38}$$

and $$\Phi_2(p) = 2\theta_2(p) = 2 \arctan \text{Im}\, \Gamma_2(p). \tag{39}$$

The differential phase shift between the signals in the two wavepaths is then $$\Delta\Phi(p) = \Phi_1(p) - \varphi_2(p) \tag{40}$$

or $$\Delta\Phi(p) = 2 \arctan \text{Im}\ \Gamma(p) = 2 \arctan \text{Im}\ \Gamma_1(p) - 2 \arctan \text{Im}\ \Gamma_2(p) \quad (41)$$

It will be noted that the procedure outlined hereinabove for partitioning the prescribed differential phase shift is such that only positive coupler sections are used in the two all-pass networks 10 and 11. As such the networks are fully realizable.

NUMERICAL EXAMPLE

Problem: Synthesize a differential phase shifter wherein $\Delta\Phi(p)$ is 90° over a four-to-one frequency band.

Solution

1. $\Delta\Phi(p) = 90 = 2 \arctan \text{Im}\ \Gamma(p)$
2. $\text{Im}\ \Gamma(p) = 1.$
3. We define the frequency band as 0.5 to 2.
4. We select six points within this band, thus defining a six section coupler. Where these points are within the band is completely arbitrary. In the instant case the points were selected to produce a constant phase ripple over the band of interest.
5. Using these parameters, we solve for the six coefficients of equation (32) and then solve equation (33) to obtain the six roots
   $p_1 = -0.1178$
   $p_2 = -0.7449$
   $p_3 = -2.6180$
   $p_4 = +8.4858$
   $p_5 = +1.3425$
   $p_6 = +0.3820.$ It will be noted that in this example all of the roots are real numbers of which three are negative and three are positive. When a root is a real number, it corresponds to a quadrature coupler having a crossover frequency $\omega_{cr}$ given by $$\omega_{cr} = -p_r. \quad (42)$$

Thus, the crossover frequencies corresponding to these six roots are $\omega_{c1} = 0.1178$
$\omega_{c2} = 0.7449$
$\omega_{c3} = 2.6180$
$\omega_{c4} = -8.4858$
$\omega_{c5} = -1.3425$
$\omega_{c6} = -0.3820$ It will be noted that there are three positive crossover frequencies, corresponding to three positive couplers, and three negative crossover frequencies, corresponding to three negative couplers. Therefore, in the resulting differential phase shifter, each of the couplers 12 and 13 in all-pass network 10 comprises a tandem array of the three positive lumped element couplers whose crossover frequencies are 0.1178, 0.7449 and 2.6180, respectively, while each of the couplers 15 and 16 in all-pass network 11 comprises a tandem array of the positive equivalent of the three negative lumped element quadrature couplers whose crossover frequencies are, respectively, 8.4858, 1.3425 and 0.3820.

In the solution of equation (33) also includes one or more pairs of conjugate complex roots, $-\alpha_r + i\ \omega_r$, a slightly different synthesis results. As illustrated in U.S. Pat. No. 3,763,437, a pair of conjugate complex roots is synthesized by means of a pair of series-connected (as opposed to tandem-connected) couplers. Specifically, a series connection is made by connecting the adjacent ends of the two windings of one of the couplers to the opposite ends of one of the windings of the second coupler. The real crossover $\omega_{c1}$ and $\omega_{c2}$ frequencies of the respective couplers of such a pair, as a function of the real and complex components $\alpha_r$ and $\omega_r$ of the complex roots are $$\omega_{c1} = 2\ \alpha_r \quad (43)$$

and $$\omega_{c2} = \frac{\alpha_r^2 + \omega_r^2}{2\alpha_r} \quad (44)$$

Thus, in all cases, each of the couplers forming the tandem array is either a single coupler having a single, real root, or a double coupler having a pair of conjugate complex roots. For each phase shifter, all of these roots are also the roots, respectively, of the $\Gamma_1(p)$ and the $\Gamma_2(p)$ functions and, in a minimum phase differential phase shifter, they are also the roots of the $\Gamma(p)$ function.

(6)

The Γ functions for the two phase shifters are $$Im\ \Gamma_1(p) = \frac{\omega^3 - 2.346\ \omega}{3.481\omega^2 - .2297} \quad (45)$$

and $$Im\ \Gamma_2(p) = \frac{\omega^3 - 15.147\ \omega}{10.210\omega^2 - 4.352} \quad (46)$$

Table I below shows the differential phase shift for the resulting network as a function of frequency.

Table I

| Frequency | Δ Phase Shift |
|---|---|
| 0.0000 | .0000 |
| .1000 | 61.1129 |
| .2000 | 82.8825 |
| .3000 | 88.5401 |
| .4000 | 89.8070 |
| .5000 | 90.0130 |
| .6000 | 90.0181 |
| .7000 | 90.0102 |
| .8000 | 90.0119 |
| .9000 | 90.0161 |
| 1.0000 | 90.0175 |
| 1.1000 | 90.0152 |
| 1.2000 | 90.0110 |
| 1.3000 | 90.0073 |
| 1.4000 | 90.0056 |
| 1.5000 | 90.0064 |
| 1.6000 | 90.0092 |
| 1.7000 | 90.0124 |
| 1.8000 | 90.0142 |
| 1.9000 | 90.0121 |
| 2.0000 | 90.0038 |
| 2.1000 | 89.9870 |
| 2.2000 | 89.9594 |
| 2.3000 | 89.9192 |
| 2.4000 | 89.8648 |
| 2.5000 | 89.7948 |
| 2.6000 | 89.7082 |
| 2.7000 | 89.6041 |
| 2.8000 | 89.4822 |
| 2.9000 | 89.3419 |
| 3.0000 | 89.1834 |

The mathematical computations provided for a nominal phase shift of 90° with a ripple of no more than 0.0053° over the band of interest. However, truncation of the decimal accuracy of the roots during the course of the calculations had the effect of slightly shifting the nominal phase shift. Thus, the tabulation always shows an actual phase shift that ripples about some value slightly greater than 90°, with a peak-to-peak variation of about twice 0.0053. To obtain this particular ripple characteristic, the frequencies of the six selected points (90° frequencies) were 0.5128, 0.6180, 0.8407, 1.1894, 1.6180 and 1.9500. A different set of frequencies would have produced a different ripple characteristic, where the ripple amplitudes would have been uneven.

Figure 6:
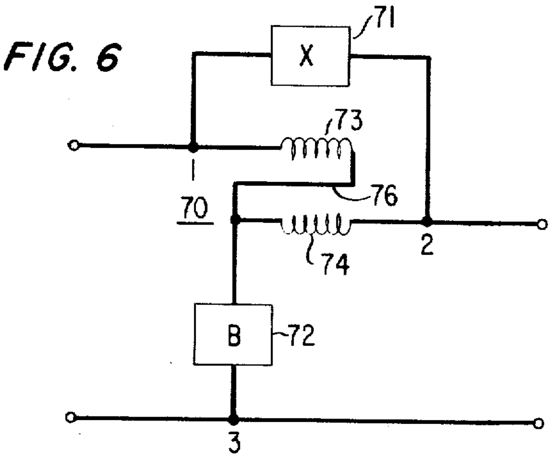
FIG. 6 shows a bridged-T phase shifter.

In the second embodiment of the invention, now to be described, the phase shift produced in each of the two wavepaths is realized by means of a bridged-T phase shifter of the type described in my above-identified copending application and illustrated in FIG. 6. Such a phase shifter comprises a tightly coupled 1:1 turns ratio transformer 70, and a pair of reactive networks 71 and 72. The two transformer windings 73 and 74 are connected series-aiding so that the magnetic fields produced by a common current flowing therethrough add constructively. This connection is indicated by a conductor 76 which is shown connecting one end of winding 73 to the opposite end of winding 74.

One of the networks 71, having a reactive impedance X, is connected across the series-connected transformer windings forming at one end a first common junction 1, and at the other end a second common junction 2. The other network 72, having a susceptance B, is connected between conductor 76 and a third common junction 3, where junctions 1–3 and junctions 2–3 constitute the two ports of the phase shifter.

As explained in said copending application, such a phase shifter has an input impedance and an output impedance $Z_0$ when the impedance X of network 71, and admittance B of network 72 are related such that $$\frac{X}{Z_0} = BZ_0 \qquad (47)$$

The phase shift $\Phi(p)$, through such a network is given by $$\Phi(p) = 2 \arctan X/2Z_0 \qquad (48)$$

or $$\Phi(p) = 2 \arctan BZ_0/2. \qquad (49)$$

If one compares equation (48) (or equation (49)) with equation (1), it is apparent that in this second embodiment of the invention, the Γ function defines the terminal impedance (or admittance) of a one-port reactive network. Specifically, $$IM\Gamma(p) = \frac{X}{2Z_0} \qquad (50)$$

$$X = 2Z_0 Im\Gamma(p) \qquad (51)$$

Thus, the first step in synthesizing a differential phase shifter using bridged - T networks, in accordance with the teachings of the present invention, is to form the $\Gamma_1(p)$ and the $\Gamma_2(p)$ functions, as outlined hereinabove in connection with FIG. 1. Once these functions are defined as a ratio of an even order polynomial and an odd order polynomial, the corresponding networks can be readily synthesized using the Foster reactance theorem as described, for example, in chapter 5 of "Communication Networks" Vol. II, by E. A. Guillemin, published by John Wiley & Sons, Inc. The physical realizability of these reactance functions is guaranteed by the design choice which requires them to be positive real.

Figure 7A:
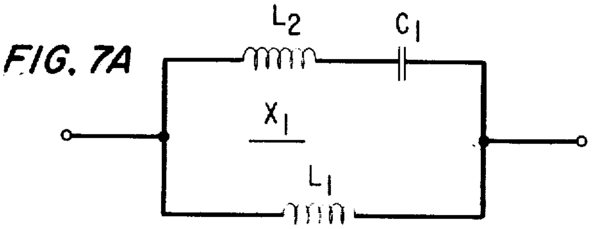
FIGS. 7A, 7B, 8A and 8B show circuit portions of two bridged-T phase shifters for synthesizing a 90 degree differential phase shifter.
Figure 7B:
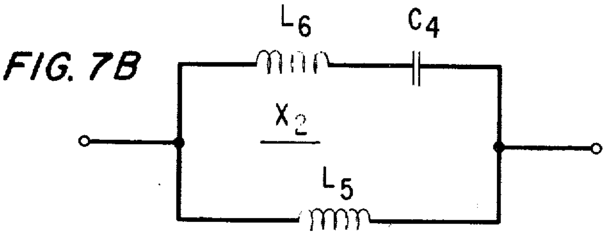

To illustrate, let us synthesize the 90° differential phase shifter in the numerical example given hereinabove using bridged-T phase shifters instead of quadrature couplers. As the $\Gamma_1(p)$ and $\Gamma_2(p)$ functions for the two phase shifters were previously derived and are given by equations (42) and (43) the $X_1$ and $X_2$ functions, as given by equation (48), are known. The resulting circuits, corresponding to network 71 for the two phase shifters, are illustrated in FIGS. 7A and 7B, respectively. Since $\Gamma_1(p)$ and $\Gamma_2(p)$ for this particular example are both third order equations, the derived networks have the same form, consisting of a parallel circuit which includes an inductor in one branch, and the series combination of an inductor and capacitor in the other branch. For the particular case of a 50 ohm system ($Z_0 = 50$) and a bandwidth which extends between 0.5 and 2.0 Mhz, the values for the inductors and capacitors are:

$L_1 = 162.6$ uh
$L_2 = 22.95$ uh
$C_1 = 470.5$ pf
$L_5 = 348.1$ uh
$L_6 = 106.8$ uh
$C_4 = 156.6$ pf.

Figure 8A:
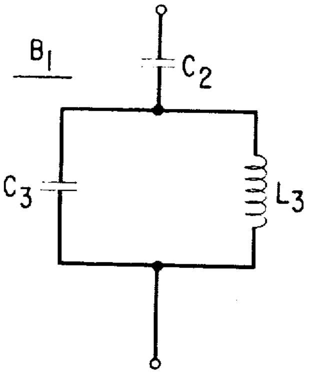
Figure 8B:
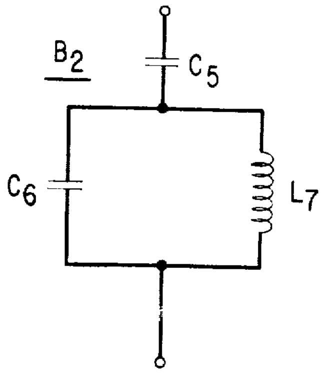

Network 72 for each phase shifter, being the dual of network 71, consists of a capacitor in series with the parallel combination of an inductor and a capacitor, as illustrated in FIGS. 8A and 8B. The specific values for the several inductors and capacitors are:

$C_2 = 0.06502$ uf
$C_3 = 0.009179$ uf
$L_3 = 1.176$ uh
$C_5 = 0.1392$ uf
$C_6 = 0.04272$ uf
$L_7 = 0.3914$ uh.

Figure 9:
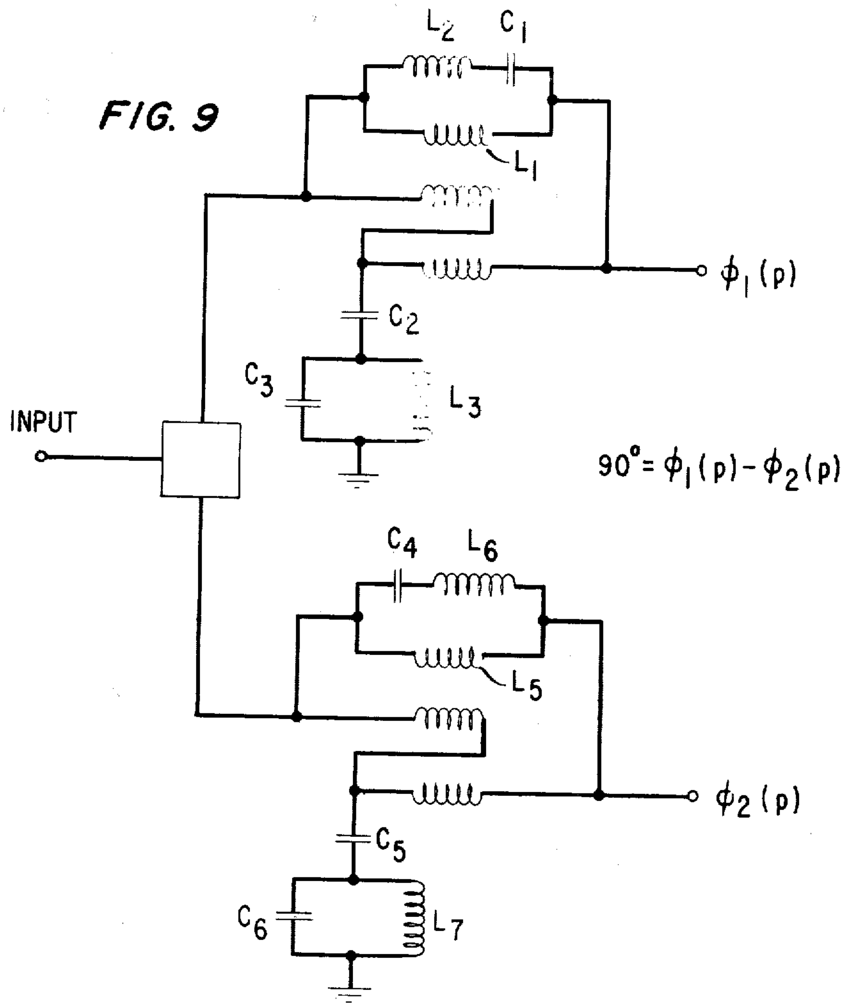
FIG. 9 shows a differential phase shifter using a pair of bridged-T phase shifters comprising the circuits of FIGS. 7A, 7B, 8A, and 8B.

The complete circuit, using bridged-T phase shifters, is shown in FIG. 9.

SUMMARY OF THE INVENTION

A procedure for synthesizing any differential phase shift $\Delta\Phi(p)$ between two signals propagating along two different wavepaths is outlined. In accordance with the present invention, a minimum phase phase shifter, made solely of passive lumped element circuit components, is included in each of the two wavepaths. Expressing the desired differential phase shift by $$\Delta\Phi(p) = 2 \arctan Im\,\Gamma(p), \qquad (52)$$

where $\Gamma(p)$ is given as a ratio of an even order polynominal $E(p)$ and an odd order polynominal $o(p)$;

and expressing the phase shifts $\Phi_1(p)$ and $\Phi_2(p)$ introduced by the respective phase shifters by $$\Phi_1(p) = 2 \arctan Im\,\Gamma_1(p), \qquad (53)$$

and $$\Phi_2(p) = 2 \arctan \operatorname{Im} \Gamma_2(p), \tag{54}$$

where $\Gamma_1(p)$ is given as a ratio of an even order polynomial $E_1(p)$ and an odd order polynomial $0(p)$;

and $\Gamma_2$ is given as a ratio of an even order polynomial $E_2(p)$ and an odd order polynomial $0_2(p)$;

it is shown that physically realizable minimum phase phase shifters are obtained if, and only if all of the roots of the equation $$E_1(p) + 0_1(p) = 0, \tag{55}$$

and the negative of all of the roots of the equation $$E_2(p) + 0_2(p) = 0 \tag{56}$$

are also the roots of the equation $$E(p) + 0(p) = 0. \tag{57}$$

In a first embodiment of the invention, the phase shifters are made of lumped element quadrature couplers. In a second embodiment of the invention, bridged-T phase shifters are employed.

It will be recognized that the particular phase shift circuits described herein are merely illustrative of two of the many possible specific embodiments which can represent applications of the principles of the invention. Thus, numerous and varied other arrangements can readily be derived in accordance with these principles by those skilled in the art without departing from the spirit and scope of the invention.

What is claimed is:

1. A minimum phase network for introducing a differential phase shift $\Delta\Phi(p)$ between two signals propagating along two different wavepaths including:

a first phase shifter located in one of said wavepaths for producing a phase shift $\Phi_1(p)$ in one of said signals;

a second phase shifter, different from said first, located in the other of said wavepaths for producing a phase shift $\Phi_2(p)$ in the other of said signals, where $\Delta\Phi(p) = \Phi_1(p) - \Phi_2(p)$, and $p = i\omega$;

characterized in that:

said first and second phase shifters comprise solely passive lumped element circuit components;

$$\Delta\Phi(p) = 2 \arctan \operatorname{Im} \Gamma(p),$$

where $\Gamma(p)$ is given as the ratio of an even order polynomial $E(p)$ and an odd order polynomial $0(p)$;

$$\Phi_1(p) = 2 \arctan \operatorname{Im} \Gamma_1(p),$$

where $\Gamma_1(p)$ is given as the ratio of an even order polynomial $E_1(p)$ and an odd order polynomial $0_1(p)$;

$$\Phi_2(p) = 2 \arctan \operatorname{Im} \Gamma_2(p),$$

where $\Gamma_2(p)$ is given as the ratio of an even order polynomial $E_2(p)$ and an odd order polynomial $0_2(p)$;

and in that all the roots of the equation $E_1(p) + 0_1(p) = 0$, and the negative of all of the roots of the equation $E_2(p) + 0_2(p) = 0$ are also the roots of the equation $E(p) + 0(p) = 0$.

2. The network according to claim 1 wherein each phase shifter is an all pass network comprising a tandem array of two identical quadrature couplers;

wherein $\Gamma_1(p)$ is the signal division ratio of each of the quadrature couplers of said first phase shifter;

and wherein $\Gamma_2(p)$ is the signal division ratio of each of the quadrature couplers of said second phase shifter.

3. The network according to claim 2 wherein:

each quadrature coupler is said first phase shifter comprises a tandem array of quadrature couplers whose roots correspond to the roots of the equation $E_1(p) + 0_1(p) = 0$;

and each quadrature coupler in said second phase shifter comprises a tandem array of quadrature couplers whose roots correspond to the roots of the equation $E_2(p) + 0_2(p) = 0$.

4. The network according to claim 1 wherein each phase shifter comprises:

a tightly coupled two-winding transformer having a 1:1 turns ratio;

one end of one transformer winding being connected to one end of the other transformer winding to form a series-aiding connection;

a first reactive network connected between the other ends of said series-connected transformer windings thereby forming at one connection a first common junction and at the other connection a second common junction;

and a second reactive network, dual to said first, connected between said one ends of said transformer windings and a third common junction;

said first and said third common junctions constituting a first port of said phase shifter;

said second and said third common junctions constituting a second port of said phase shifter;

and wherein the reactance $X_1$ of said first reactive network of said first phase shifter is equal to $2Z_0 \operatorname{Im} \Gamma_1(p)$;

and the reactance $X_2$ of said first reactive network of said second phase shifter is equal to $2Z_0 \operatorname{Im} \Gamma_2(p)$;

where $Z_0$ is the input and output impedance of said phase shifters.

* * * * *